May 8, 1923. 1,454,380
A. J. ROWLEDGE
BRAKE FOR MOTOR ROAD VEHICLES
Filed Oct. 18, 1921 6 Sheets-Sheet 2

May 8, 1923. 1,454,380
A. J. ROWLEDGE
BRAKE FOR MOTOR ROAD VEHICLES
Filed Oct. 18, 1921 6 Sheets-Sheet 3

Inventor
A. J. Rowledge,
By Watson, Coit,
Moose & Grindle,
Attorneys.

May 8, 1923.

A. J. ROWLEDGE 1,454,380

BRAKE FOR MOTOR ROAD VEHICLES

Filed Oct. 18, 1921      6 Sheets-Sheet 5

FIG. 6.

Inventor.
Arthur John Rowledge,
By Watson, Coit, Morse & Grindle
Attorneys.

Patented May 8, 1923.

1,454,380

UNITED STATES PATENT OFFICE.

ARTHUR JOHN ROWLEDGE, OF ACTON, ENGLAND, ASSIGNOR TO D. NAPIER & SON LIMITED, OF LONDON, ENGLAND, A COMPANY OF GREAT BRITAIN.

BRAKE FOR MOTOR ROAD VEHICLES.

Application filed October 18, 1921. Serial No. 508,465.

*To all whom it may concern:*

Be it known that I, ARTHUR JOHN ROWLEDGE, a subject of the King of England, and residing at Acton, in England, have invented certain new and useful Improvements in Brakes for Motor Road Vehicles, of which the following is a specification.

This invention relates to brakes for motor road vehicles and has for its object to provide means whereby the power transmitted to the road wheels may be utilized to bring about the application of the braking force irrespective of the direction in which the vehicle is running.

The operation of road wheel brakes has been effected in an existing construction through the agency of a clutch carried on a shaft which was rotated through gearing from the shaft through which power is transmitted to the road wheels, the operation of the clutch being controlled by a foot pedal. In that construction, however, the clutch was only operative on the brakes when the vehicle was running in the forward direction. In the construction forming the subject of the present invention this disadvantage is obviated and an apparatus provided which is equally operative in whichever direction the vehicle is being propelled. Further, the improved apparatus is simple and it is also conveniently disposed in relation to the other mechanism of the vehicle.

According to this invention a clutch is mounted on or actuated by a shaft through which the drive is transmitted to the road wheels and a rotatable member having two oppositely arranged cam surfaces is so mounted and arranged that a force tending to rotate it can be applied thereto through the clutch. A lever is provided which can be acted on by either of the cam surfaces in accordance with the direction in which the cam member is rotated the resultant movement of the lever causing the application of one or more brakes. A convenient arrangement is to provide a clutch which comprises two opposed annular friction members comprising one part of the clutch which rotate with and are conveniently mounted on the driving shaft with or without the interposition of gearing one of these friction members being movable in the axial direction by means of a foot or hand operated lever. A sleeve is loosely carried on the driving shaft and provided with an annular friction surface comprising the other part of the clutch which is disposed between and adapted to be gripped by the two friction members of the clutch. The sleeve carries the cam surfaces which impart movement to the brake actuating lever when the cam sleeve is caused by the operation of the clutch to rotate in one direction or the other.

The invention may be carried out in practice in various ways but the accompanying drawings illustrate by way of example one construction that may be adopted. In these drawings.

Like letters indicate like parts throughout the drawings.

On that part A of the driven shaft which projects from the end of the ordinary change speed gear box there is mounted the usual sleeve or member B carrying one portion B' of the universal joint through which the drive is transmitted to the Cardan shaft. The construction of the principal features of these parts may be on normal lines the sleeve B being slid on to the splined end A of the driving shaft so as to rotate therewith.

In the present case, however, this sleeve B is provided with a flange B² of suitable formation which carries an annular member C having a friction surface of some convenient type and construction which forms the first part of one member of the clutch. Mounted opposite to this member C is a ring member D provided with a corresponding annular friction surface the member D being arranged so that while it will rotate with the sleeve B it can also move in the axial direction relatively to the annular member C. The ring D constitutes the second part of the first member of the clutch and movement of this ring in the axial direction can be brought about by means of levers E mounted on a rock shaft E' the ends of the levers carrying a ring D' which can be pressed against the outer face of the ring D so as to move the latter towards the ring C. The shaft E' can be rocked through a lever E² and rod E³ which is connected to a lever adapted to be moved by the hand or by the foot.

Rotatably carried in a suitable manner on the driving shaft A, or as in the construction illustrated on a fixed sleeve F which surrounds the shaft A and the sleeve B, is a sleeve H which has two external flanges H' and H² formed thereon towards its opposite ends. One of these flanges H' carries an annulus H³ which lies between the friction surfaces of the annular parts C and D. The arrangement is such that when by rocking the shaft E' and moving the levers E the member D' is moved against the ring D and the latter moved towards the part C the annulus H³ which constitutes the second member of the clutch will be gripped or a drag will be imparted thereto which will tend to rotate the sleeve H with the shaft A. The second flange H² on the sleeve H is formed as or carries a cam with two similar wedge-shaped parts J which are oppositely arranged around the flange H². A roller K carried on the end of one arm K' of a suitably disposed lever rests on the surface of the cam J in such a way that if the sleeve H is turned in either direction one or the other of the cam surfaces J will act on the lever K' and turn it. The lever K' serves to actuate the brakes, being pivoted at K² and having a second arm K³ which is connected by a link K⁴ to a lever L. The latter is mounted on a rock shaft L' having on it a lever L² which is connected by a rod L³ to the brakes. These brakes are of some suitable type and act either on the driving or rear wheels of the vehicle only or, if desired, also on the front wheels.

The arrangement is such that when the hand or foot lever controlling the clutch is moved so as to rock the shaft E' and cause the annulus H³ to be gripped between the members C and D the sleeve H with the cam J will be rotated in one direction or the other and the lever K' will thereby be moved and by exerting a pull on the rod L³ will apply the brakes.

It is to be noted that the brake lever K' will thus be actuated by the cam surfaces J irrespective of the direction of rotation of the driving shaft A and hence the brakes will be applied when the clutch is operated whether the vehicle is running forwards or backwards.

Figure 1:
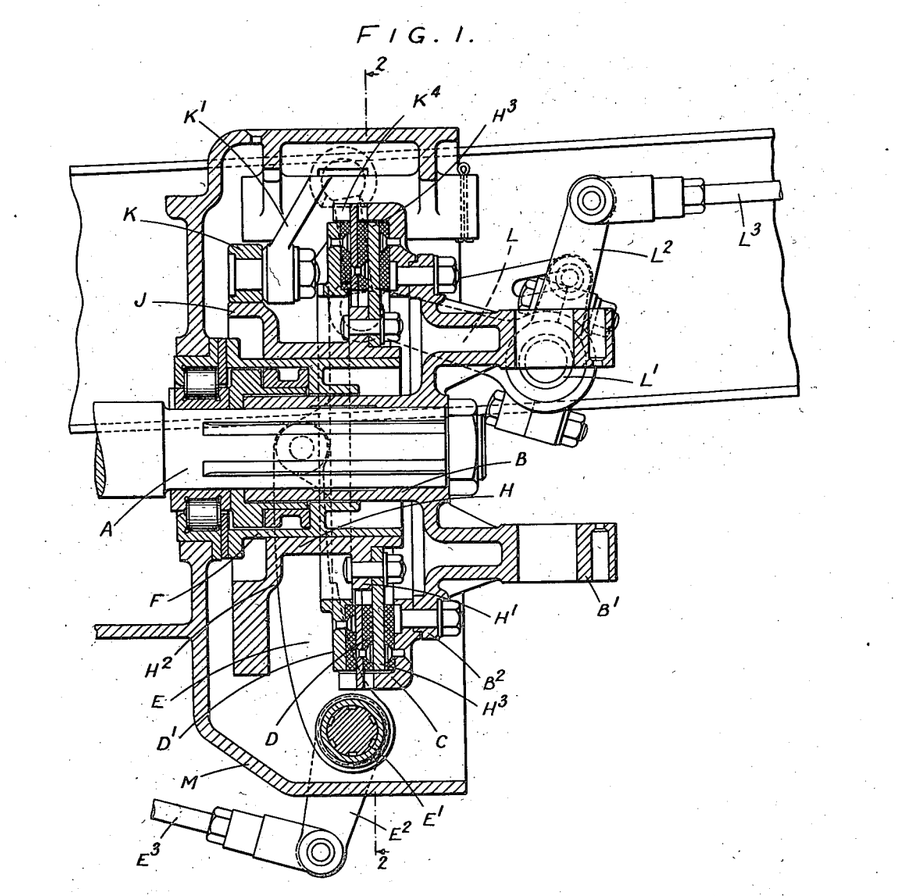
Figure 1 is a longitudinal sectional elevation of the improved brake actuating mechanism the section being taken on the line 1—1 in Figure 2 looking in the direction of the arrows.
Figure 2:
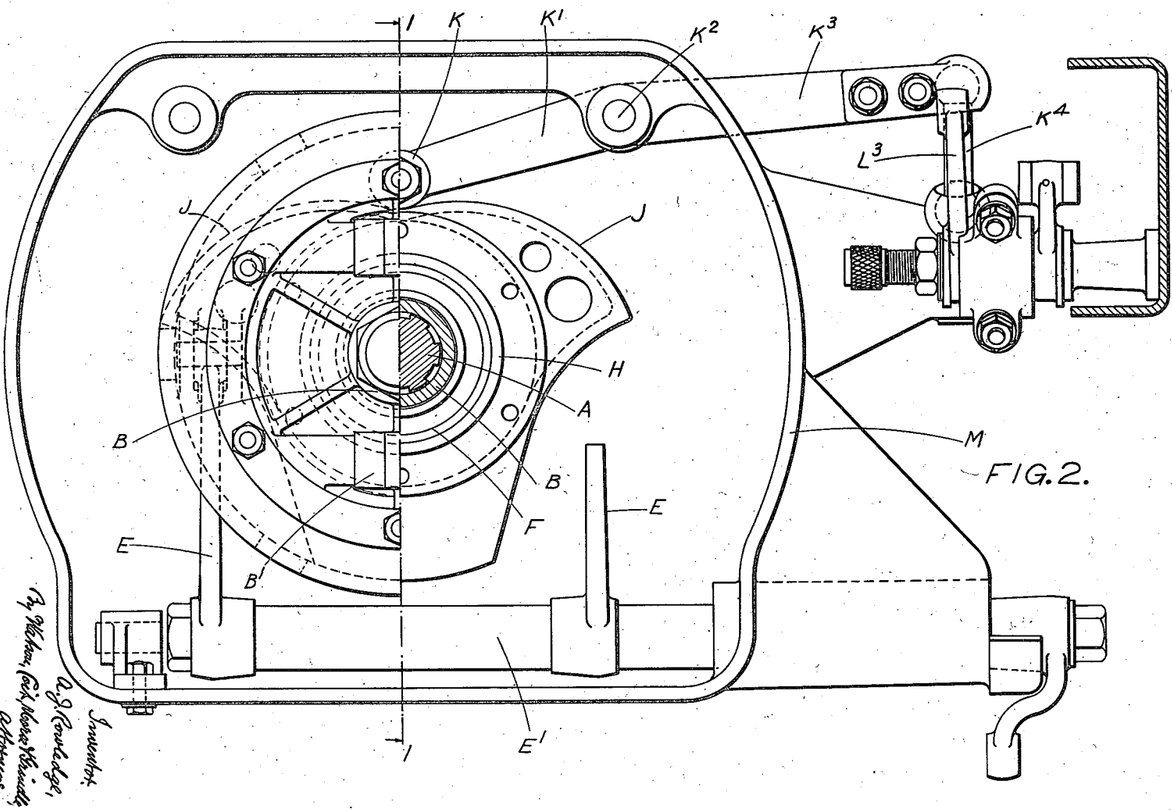
Figure 2 is as to the right hand part of the figure a transverse section on the line 2—2 in Figure 1 looking in the direction of the arrows, while the left hand part of Figure 2 is an end elevation of the apparatus as shown in Figure 1.
Figure 6:
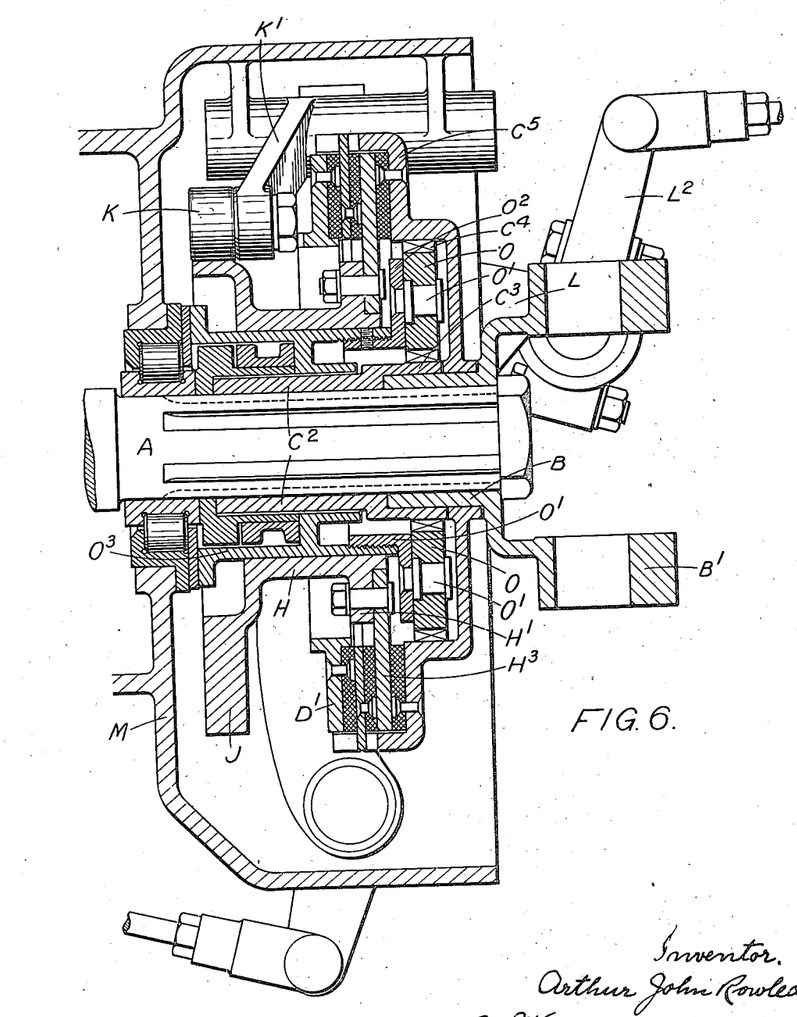
Fig. 6 is a longitudinal sectional elevation similar to Figures 1 and 3 of brake actuating mechanism in which epicyclic gearing is employed.

As mentioned, the clutch member C may be either driven direct from the shaft A as shown in Figures 1 and 2 or it may be driven through epicyclic gearing as shown in Figure 6. In this arrangement the driving shaft A has fixed thereon a sleeve C² which carries an externally toothed ring C³ meshing with a series of planet wheels O mounted on spindles O' secured in the face of an annular member O² which is screw threaded to engage one end of a fixed sleeve O³, the other end of which is secured to the casing M of the clutch. The planet wheels O also engage with an internally toothed ring C⁴ formed on the inside of the clutch member C⁵ which is rotatably mounted on the sleeve portion B of the universal joint B'. Thus the externally toothed ring C³ imparts rotation to the planet wheels O which in turn impart rotation to the internally toothed ring C⁴ and hence to the clutch member C⁵. In this manner the clutch member C⁵ is rotated at a lower speed than the driving shaft A. The construction of the other parts of the clutch and the operation thereof are the same as for the arrangement illustrated in Figures 1 and 2.

Figure 7:
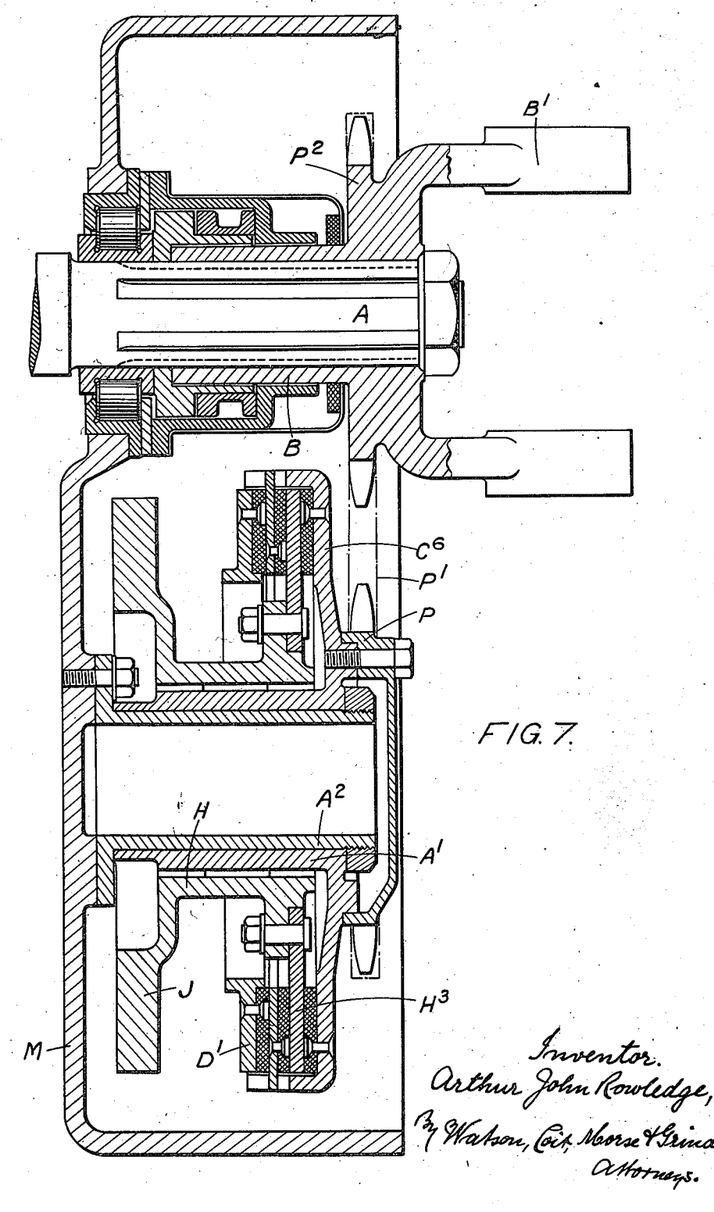
Fig. 7 is a similar view of an arrangement in which the clutch is mounted on a lay shaft.

In the construction illustrated in Figure 7 an alternative arrangement is shown in which a hollow lay shaft A' is provided rotatably carried on a fixed trunnion A² and having a sprocket P mounted on one end thereof adapted to be driven by a chain from another sprocket P² formed integral with the part B B' of the universal joint which is fixed on the end of the shaft A. The operation of the clutch is similar to that of the arrangement illustrated in Figures 1 and 2 the clutch member C⁶ being formed integral with the lay shaft A' and the clutch member H carrying the cam J being movable in an axial direction so as to cause the engagement or the disengagement of the clutch members.

Figures 3, 5:
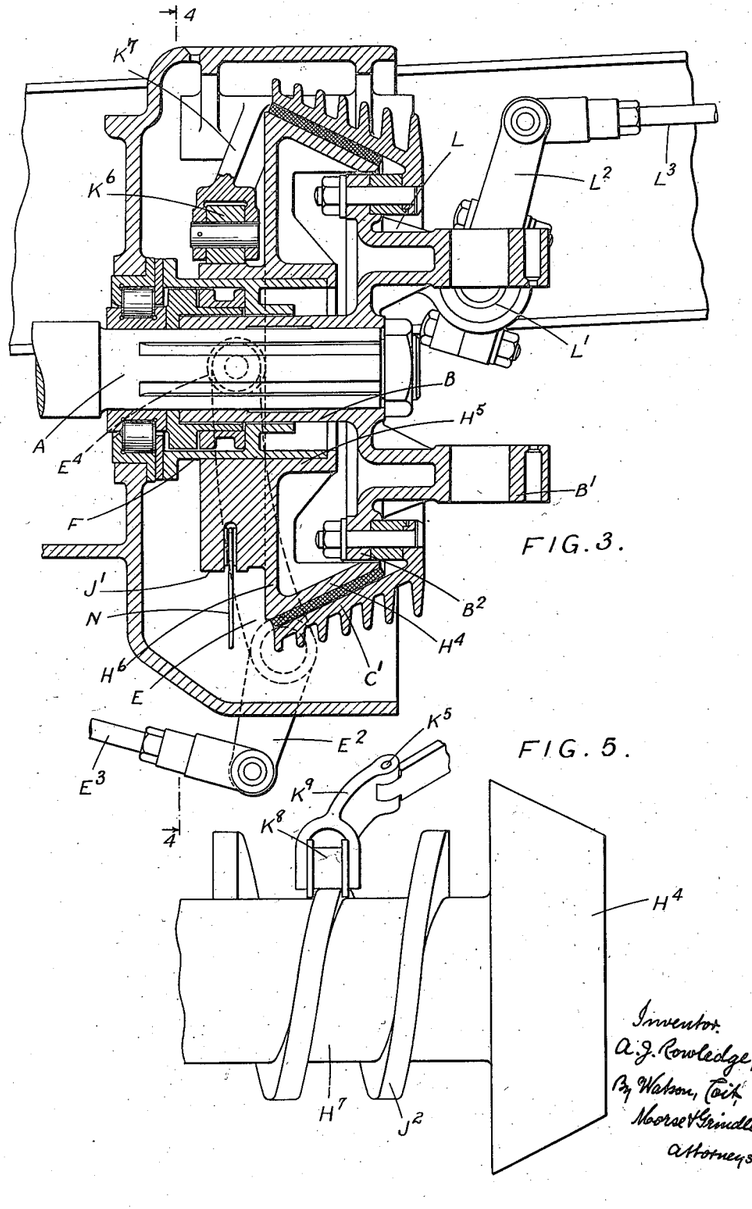
Figure 3 is a longitudinal sectional elevation similar to Figure 1 showing a modified construction of the apparatus in which the clutch is of the cone type.
Figure 5 is a side elevation or part of the clutch and cam mechanism illustrating a modification in the form of the cam.
Figure 4:
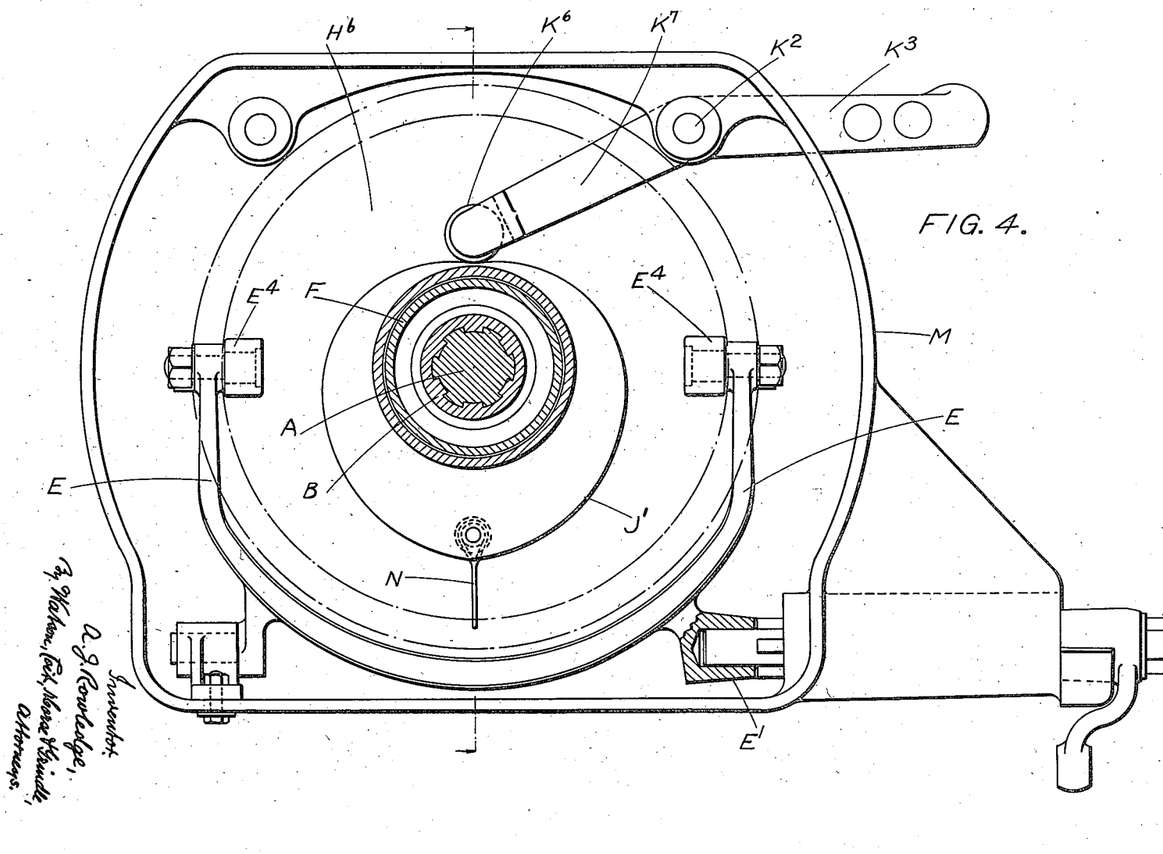
Figure 4 is a transverse section taken on the line 4—4 in Figure 3 looking in the direction of the arrows.

In the construction illustrated in Figures 3 and 4, the clutch in place of being of the plate type comprises coned members. One of these members is constituted by the part C' carried by the flange B² of the sleeve B which is mounted on the end of the driven shaft A. The second member of the clutch is constituted by the cone H⁴ which is provided with suitable friction covering and lies within the cone C'. The cone H⁴ is mounted on or formed integral with the flange H⁶ which projects from the sleeve H⁵. The latter is free to rotate and slide longitudinally upon the fixed sleeve F so that the opposed surfaces of the cones H⁴ and C' can be engaged or disengaged when desired. The sleeve H⁵ and flange H⁶ carries the cam J' which, in this case, as shown in Figure 4 is substantially heart-shaped the two operative and oppositely arranged cam surfaces being continued for 180° around either side. Thus a more gradual lift is given to the lever K⁷ on the end of which is the roller K⁶ bearing on the surface of the cam J'. The movement necessary to cause the clutch members to engage is effected by means of levers E on the ends of which are rollers E⁴ bearing on the face of the flange H⁶. When the shaft E' which carries the levers E is rocked through the rod E³ and lever E² the sleeve H⁵ is caused to slide so as to bring the cone H⁴ into engagement with the cone C'. The sleeve H⁵ and cam J' then rotate with the sleeve B and driving shaft A and movement is imparted to the lever K⁷ which is communicated through the levers L and L² and the rod L³ to the brake mechanism so that the brakes will be applied.

In order to restore the cam J' to its initial position in which it is shown in Figure 4 after the clutch members have been disengaged, various means may be employed. For example a wire N may be connected at one end to the cam as shown while at the other end the wire is acted on in some convenient manner by a weight or spring. When the cam is rotated the wire N will be wound up on the surface of the cam J' and as soon as the clutch members are disengaged the weight or spring will act through the wire N and rotate the cam and sleeve H⁵ in the opposite direction so as to restore the parts to their normal position of rest. This will permit the lever K⁷ K³ to move so as to release the brakes.

The clutch may be otherwise constructed or the members thereof arranged in different ways as desired.

The cam or cams J may also be constructed and arranged in various ways. In the arrangement shown in Figure 5 the cams are formed as a spiral mounted on the sleeve H⁷. With this construction a greater leverage and a more gradual lift is provided for the movement of the lever K⁹. In this case this lever is conveniently hinged as at K⁵ so as to permit the roller K⁸ to move along the sleeve H⁷ and ride on the spiral cam J² the roller being flanged to maintain it on the cam. Means such as a weight or spring acting through a wire or cable as described in connection with the construction of Figure 4 for the purpose of restoring the cam member to its initial position may be employed in this case and also in the construction shown in Figures 1 and 2 if desired the wire being arranged so as to be wound on a suitable part of the sleeve H or on a part mounted thereon or connected thereto.

As indicated, the details of construction may be varied as found desirable and the apparatus may be modified to effect the application of brakes of various types. The clutch members and the cam are conveniently mounted within a casing M which may be carried on the after end of the change speed gear box but the apparatus may be otherwise disposed on or about some portion of the shafting through which the drive is transmitted to the road wheels.

What I claim as my invention and desire to secure by Letters Patent is:—

1. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, means for causing the clutch members to engage, a cam member rotatable by the second clutch member and having two oppositely arranged operative parts, a lever which is acted on by the cam member and moved thereby when the cam member is rotated in either direction, and means actuated by this lever for applying the vehicle brakes as set forth.

2. In brake actuating mechanism for a motor road vehicle the combination with a shaft through which the drive is transmitted from a source of power to the road wheels, a clutch member mounted on and rotatable by this shaft, a second clutch member adapted to engage the first clutch member and mounted freely so that it can rotate in either direction, means for causing the clutch members to engage, a cam member rotatable by the second clutch member and having two oppositely arranged operative parts, a lever which is acted on by the cam member and moved thereby when the cam member is rotated in either direction, and means actuated by this lever for applying the vehicle brakes as set forth.

3. In brake actuating mechanism for a motor road vehicle the combination with a shaft through which the drive is transmitted from a source of power to the road wheels, a clutch member adapted to be rotated in either direction by this shaft, a sleeve-like member mounted so as to be rotatable in either direction, a second clutch member adapted to engage the first clutch member and mounted on the rotatable sleeve, means for causing the clutch members to engage, a cam member mounted on the rotatable sleeve and having two oppositely arranged operative parts, a lever which is acted on by the cam member and moved thereby when the cam member is rotated in either direction, and means actuated by this lever for applying the vehicle brakes as set forth.

4. In brake actuating mechanism for a motor road vehicle the combination with a shaft through which the drive is transmitted from a source of power to the road wheels, a clutch member mounted on and rotatable by this shaft, a second clutch member adapted to engage the first clutch member and mounted freely on the shaft so that it can rotate in either direction, means for causing the clutch members to engage, a cam member rotatable by the second clutch member and having two oppositely arranged operative parts, a lever which is acted on by the cam member and moved thereby when the cam member is rotated in either direction and means actuated by this lever for applying the vehicle brakes as set forth.

5. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, means for causing the clutch members to engage, a cam rotatable with the second clutch member and having two similar and oppositely arranged inclined parts, a lever which is acted on by the cam member and moved thereby when the cam is rotated in either direction, and means actuated by this lever for applying the vehicle brakes as set forth.

6. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, means for causing the clutch members to engage, a cam member mounted concentrically with the clutch members and rotatable by the second clutch member this cam member having two oppositely arranged operative parts, a lever which is acted on by the cam member and moved thereby when the cam member is rotated in either direction, and means actuated by this lever for applying the vehicle brakes as set forth.

7. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, a member movable in the direction of the axis of the clutch members and operative to cause these clutch members to engage, means for imparting movement to this last mentioned member, a cam member rotatable by the second clutch member and having two oppositely arranged operative parts, a lever which is acted on by the cam member and moved thereby when the cam member is rotated in either direction, and means actuated by this lever for applying the vehicle brakes as set forth.

8. In brake actuating mechanism for a motor road vehicle the combination with a shaft through which the drive is transmitted from a source of power to the road wheels, a clutch member mounted on and rotatable by this shaft, a sleeve-like member mounted so as to be rotatable in either direction, a second clutch member adapted to engage the first clutch member and mounted on the rotatable sleeve, means for causing the clutch members to engage, a cam member mounted on the rotatable sleeve and having two oppositely arranged operative parts, a lever which is acted on by the cam member and moved thereby when the cam member is rotated in either direction, and means actuated by this lever for applying the vehicle brakes as set forth.

9. In brake actuating mechanism for a motor road vehicle the combination with a shaft through which the drive is transmitted from a source of power to the road wheels, a clutch member mounted on and rotatable by this shaft, a sleeve-like member mounted so as to be rotatable in either direction on the said shaft adjacent to the first clutch member, a second clutch member adapted to engage the first clutch member and mounted on the rotatable sleeve, means for causing the clutch members to engage, a cam member mounted on the rotatable sleeve and having two oppositely arranged operative parts, a lever which is acted on by the cam member and moved thereby when the cam member is rotated in either direction, and means actuated by this lever for applying the vehicle brakes as set forth.

10. In brake actuating mechanism for a motor road vehicle the combination with a shaft through which the drive is transmitted from a source of power to the road wheels, a clutch member mounted on and rotatable by this shaft, a second clutch member adapted to engage the first clutch member and mounted freely on the said shaft so that it can rotate in either direction, a member movable in the direction of the axis of the clutch members and operative to cause these clutch members to engage, means for imparting movement to this member, a cam member rotatable by the second clutch member and having two oppositely arranged operative parts, a lever which is acted on by the cam member and moved thereby when the cam member is rotated in either direction, and means actuated by this lever for applying the vehicle brakes as set forth.

11. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, means for causing the clutch members to engage, a cam member rotatable by the second clutch member and having a continuous cam surface with oppositely inclined and operative portions, a lever which is acted on by the cam member and moved thereby when the cam member is rotated in either direction, and means actuated by this lever for applying the vehicle brakes as set forth.

12. In brake actuating mechanism for a motor road vehicle the combination with a shaft through which the drive is transmitted from a source of power to the road wheels, a clutch member adapted to be rotated in either direction by this shaft, a second clutch member adapted to engage the first clutch member and mounted freely so that it can rotate in either direction, means for causing the clutch members to engage, a cam member rotatable by the second clutch member and having a continuous cam surface with oppositely inclined and operative portions, a lever which engages the inclined and operative portions of the cam member and is moved thereby when the cam member is rotated in either direction, and means actuated by this lever for applying the vehicle brakes as set forth.

13. In brake actuating mechanism for a motor road vehicle the combination with a shaft through which the drive is transmitted from a source of power to the road wheels, a clutch member mounted on and rotatable by this shaft, a second clutch member adapted to engage the first clutch member and mounted freely on the shaft so that it can rotate in either direction, means for causing the clutch members to engage, a cam member rotatable by the second clutch member and having a continuous cam surface with oppositely inclined and operative portions, a lever which is acted on by the cam member and moved thereby when the cam member is rotated in either direction, and means actuated by this lever for applying the vehicle brakes as set forth.

In testimony whereof I have signed my name to this specification.

ARTHUR JOHN ROWLEDGE.